(12) United States Patent
Liberace et al.

(10) Patent No.: US 9,694,748 B2
(45) Date of Patent: Jul. 4, 2017

(54) INNOVATIVE SYSTEM OF COMMAND AND CONTROL AND OF AIMING AND FIRING FOR MILITARY LAND VEHICLES EQUIPPED WITH AT LEAST ONE WEAPON

(71) Applicant: SELEX ES S.p.A., Rome (IT)

(72) Inventors: Claudio Liberace, Rome (IT); Alessandro Elefante, Rome (IT)

(73) Assignee: SELEX ES S.P.A. (IT)

( * ) Notice: Subject to any disclaimer, the term of this patent is extended or adjusted under 35 U.S.C. 154(b) by 71 days.

(21) Appl. No.: 14/434,218

(22) PCT Filed: Oct. 16, 2013

(86) PCT No.: PCT/IB2013/059403
§ 371 (c)(1),
(2) Date: Apr. 8, 2015

(87) PCT Pub. No.: WO2014/060970
PCT Pub. Date: Apr. 24, 2014

(65) Prior Publication Data
US 2015/0274075 A1    Oct. 1, 2015

(30) Foreign Application Priority Data
Oct. 16, 2012    (IT) .............................. TO2012A0908

(51) Int. Cl.
*G06F 17/00*    (2006.01)
*B60R 1/00*    (2006.01)
(Continued)

(52) U.S. Cl.
CPC .............. *B60R 1/00* (2013.01); *B60R 16/023* (2013.01); *F41G 3/165* (2013.01); *F41G 3/22* (2013.01); *G05B 15/02* (2013.01); *B60R 2300/80* (2013.01)

(58) Field of Classification Search
CPC ... F41G 3/165; F41G 3/22; B60R 1/00; B60R 16/023; B60R 2300/80
(Continued)

(56) References Cited

U.S. PATENT DOCUMENTS 4,318,330 A    3/1982    Hausenblas
5,781,437 A    7/1998    Wiemer et al.
(Continued)

FOREIGN PATENT DOCUMENTS

| DE | 4207251 | 9/1993 |
|----|---------|--------|
| WO | 2011070478 | 6/2011 |

OTHER PUBLICATIONS

Corresponding International Search Report and Written Opinion for PCT/IB2013/059403 dated Mar. 20, 2014.

*Primary Examiner* — Ziaul Karim
(74) *Attorney, Agent, or Firm* — The Belles Group, P.C.

(57) ABSTRACT

The invention regards a system of command and control and of aiming and firing for a military land vehicle equipped with at least one weapon. This system of command and control and of aiming and firing comprises: an external vision system for aiming and firing operationally associated with a weapon of the military vehicle; an external vision system for command and control; an aiming and firing user interface configured to control both the external vision system for aiming and firing and the associated weapon, and the external vision system for command and control; and a command and control user interface configured to control both the external vision system for command and control and the external vision system for aiming and firing and the associated weapon.

8 Claims, 1 Drawing Sheet

(51) Int. Cl.
*F41G 3/16* (2006.01)
*F41G 3/22* (2006.01)
*B60R 16/023* (2006.01)
*G05B 15/02* (2006.01)

(58) Field of Classification Search
USPC ............ 700/90; 348/148, 239; 382/143, 103
See application file for complete search history.

(56) References Cited

U.S. PATENT DOCUMENTS

| | | | | |
|---|---|---|---|---|
| 8,553,935 | B2* | 10/2013 | Mandella | G01B 21/04 |
| | | | | 178/18.09 |
| 9,081,409 | B2* | 7/2015 | Soles | G08B 13/126 |
| 9,384,577 | B2* | 7/2016 | Magi | F41G 3/165 |
| 2004/0100567 | A1* | 5/2004 | Miller | G02B 27/0093 |
| | | | | 348/239 |
| 2009/0087029 | A1* | 4/2009 | Coleman | G06K 9/00208 |
| | | | | 382/103 |
| 2009/0195652 | A1* | 8/2009 | Gal | B60R 1/00 |
| | | | | 348/148 |
| 2009/0290019 | A1* | 11/2009 | McNelis | F41G 3/06 |
| | | | | 348/143 |
| 2011/0249086 | A1* | 10/2011 | Guo | H04N 7/147 |
| | | | | 348/14.12 |

* cited by examiner

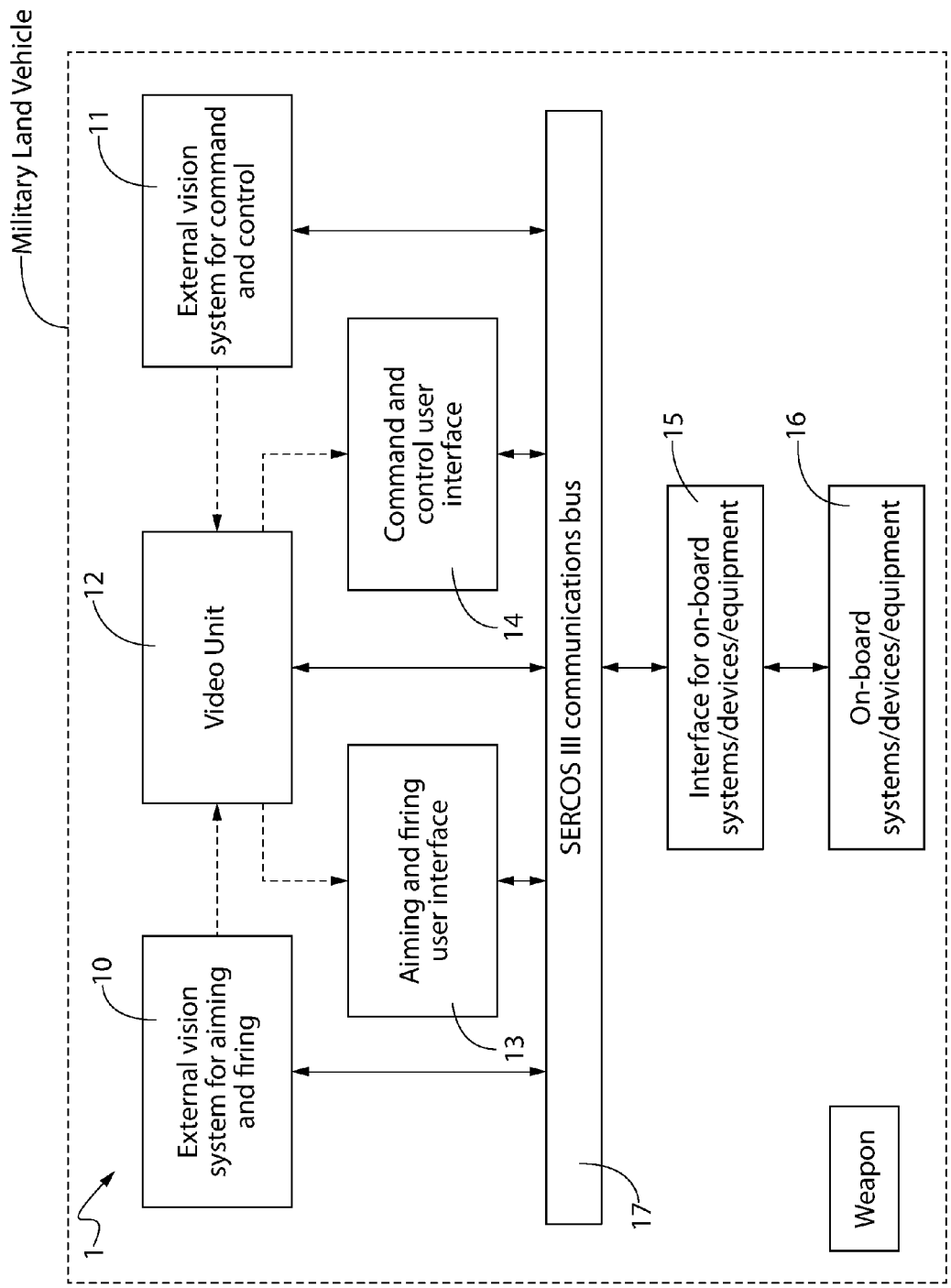

INNOVATIVE SYSTEM OF COMMAND AND CONTROL AND OF AIMING AND FIRING FOR MILITARY LAND VEHICLES EQUIPPED WITH AT LEAST ONE WEAPON

CROSS-REFERENCE TO RELATED PATENT APPLICATIONS

The present application is a U.S. national stage application under 35 U.S.C. §371 of PCT Application No. PCT/IB2013/059403, filed Oct. 16, 2013, which in turn claims priority to Italian Application No. TO2012A000908, filed Oct. 16, 2012, the entireties of which are incorporated herein by reference.

TECHNICAL FIELD OF THE INVENTION

The present invention relates to an innovative system of command and control and of aiming and firing for military land vehicles equipped with at least one weapon, such as, for example, tanks, infantry combat vehicles, etc. In particular, the present invention regards a system of command and control and of aiming and firing comprising two or more user interfaces capable of dynamically changing the operational role performed, between that of command and control and that of aiming and firing.

STATE OF THE ART

As is known, nowadays, military land vehicles are generally equipped with external vision systems configured to capture video streams, or rather sequences of images, of the outside surroundings. For example, many military land vehicles are equipped with daytime vision systems configured to capture video streams of the outside surroundings in the visible spectral band (namely at wavelengths in the range between approximately 380/400 nm and 700/750 nm) and night-time vision systems configured to capture video streams of the outside surroundings in the infrared spectral band (namely at mid-infrared wavelengths in the range between 3 and 5 µm and far-infrared wavelengths in the range between 8 and 12 µm).

In general, an external vision system of a military land vehicle comprises:
  a first video capture device installed on the outside of the military land vehicle and configured to capture a first video stream of the surroundings outside the military land vehicle in the visible spectral band; and
  a second video capture device installed on the outside of the military land vehicle and configured to capture a second video stream of the surroundings outside the military land vehicle in the infrared (IR) spectral band.

Furthermore, an external vision system of a military land vehicle is generally coupled to a respective user interface that is installed inside the crew compartment of the military land vehicle, is connected to said external vision system to receive the captured video streams and is configured to enable a user to control the operation of said external vision system and to display of a video stream received from said external vision system.

In particular, s user interface for an external vision system of a military land vehicle conveniently comprises:
  a screen configured to display a video stream received from said external vision system; and
  control means, for example comprising a control stick or a joystick and a push-button panel (conveniently provided on the edges of the screen or on a control panel separate from the screen), configured to enable a user to control, i.e. govern, the external vision system; for example, a user can control the aiming of the video capture devices via said control stick/joystick and can control, i.e. govern, the external vision system by means of the push-button panel, for example, selecting the type of video stream (in the visible or IR spectral band) to be displayed on the screen via the push-button panel.

The user interface can be installed in various positions inside the crew compartment of the military vehicle, for example, in the commander's station of the military vehicle. In this case, we can talk of command and control user interface and, in the same manner, the respective external vision system could be conveniently called external vision system for command and control.

Generally, in the case of a military land vehicle equipped with a weapon, for example, in the case of a tank or an infantry combat vehicle, an external vision system is operationally associated with said weapon so as to enable an artilleryman/gunner to control the aiming and firing. In this case, the user interface of the external vision system is conveniently installed inside the crew compartment of the military vehicle in an artilleryman's/gunner's station, and is generally called an aiming and firing user interface. In the same way, the external vision system that is operationally associated with a weapon so as to enable controlling the aiming and firing can be conveniently called external vision system for aiming and firing.

In addition, military land vehicles are also generally equipped with so-called "close-defence" perimeter sensors that enable having a complete view of the perimeter around the military vehicle. These perimeter sensors can conveniently comprise video capture devices that operate in the visible and/or infrared (IR) spectral bands.

Currently, the command and control user interface and the aiming and firing user interface are designed to control only the respective external vision system to which they are coupled. In particular, in use, the commander of a military land vehicle observes the situation outside the military vehicle via the command and control user interface and, if necessary, designates the targets that are to be fired upon, while an artilleryman/gunner handles the aiming at targets designated by the commander and the shot, or firing, against said targets via the aiming and firing user interface.

In the case where one of the two user interfaces becomes damaged (for example, because it is hit during combat), it is no longer possible to operate the respective external vision system coupled to said damaged user interface. Moreover, in the case where the aiming and firing user interface is damaged, it is no longer possible to operate the weapon controlled by said damaged aiming and firing user interface.

On the other hand, in the case where the commander or the artilleryman/gunner are unable to perform their duties (for example, because of being wounded in combat), it is necessary that another operator of the military vehicle moves into the station of the commander or the artilleryman/gunner in order to use the command and control user interface or the aiming and firing user interface. In particular, in the case where the commander is unable to carry out his/her duties of observation and designation, it is necessary that another operator of the military vehicle moves into the commander's station in order to use the command and control user interface and consequently perform the above-stated observation and designation duties. In the same way, in the case where an artilleryman/gunner is unable to carry out his/her duties of aiming and firing, it is necessary that another operator of the military vehicle moves into said artilleryman's/gunner's station in order to use the respective aiming and firing user interface and consequently perform the above-stated aiming and firing duties.

A known system of command and control and of aiming and firing for military land vehicles is described in international patent application WO 2011/070478 A1, which relates to a system and method for controlling the orientation of a turret of a military land vehicle, for example a tank.

OBJECT AND SUMMARY OF THE INVENTION

The object of the present invention is therefore that of providing a system capable of solving the previously described drawbacks of current user interfaces for command and control and for aiming and firing.

The above-stated object is achieved by the present invention insofar as it relates to an innovative system of command and control and of aiming and firing for military land vehicles equipped with at least one weapon, as defined in the appended claims.

In particular, the present invention concerns a system of command and control and of aiming and firing that is designed to be installed on board a military land vehicle equipped with at least one weapon and which comprises:
- an external vision system for aiming and firing operationally associated with a weapon of the military land vehicle and configured to capture a plurality of first video streams of a scene outside the military land vehicle in a direction in which said weapon is aimed;
- an external vision system for command and control configured to capture a plurality of second video streams of the scene outside the military land vehicle;
- an aiming and firing user interface designed to be installed on board the military land vehicle in an artilleryman's/gunner's station and configured to perform
- an operational role of aiming and firing by displaying one of the first video streams captured by the external vision system for aiming and firing and controlling the external vision system for aiming and firing and the associated weapon, and
- also an operational role of command and control by displaying one of the second video streams captured by the external vision system for command and control and controlling the external vision system for command and control; and
- a command and control user interface designed to be installed on board the military land vehicle in a command station and configured to perform
- the operational role of command and control by displaying one of the second video streams captured by the external vision system for command and control and controlling the external vision system for command and control, and
- also the operational role of aiming and firing by displaying one of the first video streams captured by the external vision system for aiming and firing and controlling the external vision system for aiming and firing and the associated weapon.

The system of command and control and of aiming and firing according to the present invention is characterized in that
the command and control user interface is further configured to:
- enable a respective user to request a change of operational role for said command and control user interface;
- start performing the operational role of aiming and firing if a respective user requests a change of operational role for said command and control user interface when the latter is performing the operational role of command and control;
- start performing the operational role of command and control if a respective user requests a change of operational role for said command and control user interface when the latter is performing the operational role of aiming and firing; and
- enable a respective user to give or refuse his/her assent to a change of operational role requested by a user of the aiming and firing user interface for said aiming and firing user interface; and the aiming and firing user interface is further configured to:
- enable a respective user to request a change of operational role for said aiming and firing user interface;
- start performing the operational role of command and control if a respective user requests a change of operational role for said aiming and firing user interface when the latter is performing the operational role of aiming and firing and if a user of the command and control user interface gives his/her assent to said change of operational role;
- start performing the operational role of command and control if a respective user requests a change of operational role for said aiming and firing user interface when the latter is performing the operational role of aiming and firing and if, within a predetermined time period, a user of the command and control user interface neither gives nor refuses his/her assent to said change of operational role;
- start performing the operational role of aiming and firing if a respective user requests a change of operational role for said aiming and firing user interface when the latter is performing the operational role of command and control and if a user of the command and control user interface gives his/her assent to said change of operational role;
- start performing the operational role of aiming and firing if a respective user requests a change of operational role for said aiming and firing user interface when the latter is performing the operational role of command and control and if, within a predetermined time period, a user of the command and control user interface neither gives nor refuses his/her assent to said change of operational role; and
- continue to perform the operational role that is already being performed if a respective user requests a change of operational role for said aiming and firing user interface and a user of the command and control user interface refuses his/her assent to said change of operational role.

BRIEF DESCRIPTION OF THE DRAWING

For a better understanding of the present invention, some preferred embodiments, provided by way of non-limitative example, will now be described with reference to the attached drawing (not to scale), which schematically illustrates an example architecture of a system of command and control and of aiming and firing for military land vehicles according to a preferred embodiment of the present invention.

DETAILED DESCRIPTION OF PREFERRED EMBODIMENTS OF THE INVENTION

The following description is provided to enable an expert in the field to embody and use the invention. Various modifications to the embodiments shown will be immediately obvious to experts and the generic principles described herein could be applied to other embodiments and applications without, however, leaving the scope of the present invention.

Thus, the present invention is not intended to be limited to just the embodiments set forth herein, but is to be accorded the widest scope consistent with the principles and features disclosed herein and defined in the appended claims.

The present invention concerns a system for military land vehicles equipped with at least one weapon in which the user interfaces of the external vision systems are universal, or rather are utilizable both for observation and designation duties and for aiming and firing duties. In fact, according to the present invention, a user interface, whether originally dedicated to the control of an external vision system for command and control, i.e. used for observation and designation duties, or to the control of an external vision system for aiming and firing a weapon, i.e. used for weapon aiming and firing duties, can change its operational role at any time, assuming that of the other user interface present on board the military land vehicle.

In particular, according to the present invention, a user interface originally dedicated to the control of an external vision system for command and control, i.e. used for observation and designation duties, can take control of an external vision system for aiming and firing a weapon at any time, i.e. can be used for weapon aiming and firing duties. In the same way, always according to the present invention, a user interface originally dedicated to the control of an external vision system for aiming and firing a weapon, i.e. used for weapon aiming and firing duties, can take control of an external vision system for command and control at any time, i.e. can be used for observation and designation duties.

In detail, according to the present invention, the different user interfaces are able to dynamically change their operational role so as to enable both the commander and an artilleryman/gunner to operate on the other external vision system in the case where the assigned operator cannot do so, for example, in the case where the commander or an artilleryman/gunner is unable to perform his/her duties because of being wounded, or in the case where one of the user interfaces is damaged.

Conveniently, the change of operational role is implemented electronically by placing the different external vision systems and the various user interfaces in communication with each other via a deterministic communications bus, preferably based on SERCOS (SErial Real-time COmmunications System) technology of the third generation (i.e. SERCOS III).

In order to describe the present invention in detail, the attached FIGURE shows a block diagram that represents an example architecture of a system of command and control and of aiming and firing (indicated as a whole by reference numeral 1) produced according to a preferred embodiment of the present invention and installed on a military land vehicle equipped with at least one weapon.

In particular, as shown in the attached FIGURE, the system of command and control and of aiming and firing 1 comprises:

- an external vision system for aiming and firing 10 that is operationally associated with a weapon of the military land vehicle and includes
  - a first video capture device (not shown in the attached FIGURE for simplicity of illustration) configured to capture, in the visible spectral band, a first video stream of the scene outside the military land vehicle in a direction in which said weapon is aimed, and
  - a second video capture device (not shown in the attached FIGURE for simplicity of illustration) configured to capture, in the infrared (IR) spectral band, a second video stream of the scene outside the military land vehicle in the direction in which said weapon is aimed;
- an external vision system for command and control 11 that includes
  - a third video capture device (not shown in the attached FIGURE for simplicity of illustration) configured to capture a third video stream of the scene outside the military land vehicle in the visible spectral band, and
  - a fourth video capture device (not shown in the attached FIGURE for simplicity of illustration) configured to capture a fourth video stream of the scene outside the military land vehicle in the infrared (IR) spectral band;
- a video unit 12 connected to the external vision system for aiming and firing 10 and to the external vision system for command and control 11 to receive, respectively, the first and second video streams captured by the first and second video capture devices and the third and fourth video stream captured by the third and fourth video capture devices;
- an aiming and firing user interface 13 that is installed inside the crew compartment of the military land vehicle in an artilleryman's/gunner's station, is connected to the video unit 12 to receive a video stream between the first and second video streams or, in the case of user-requested change of operational role, between the third and fourth video streams, and includes
  - a first screen (not shown in the attached FIGURE for simplicity of illustration) configured to display the video stream received from said video unit 12, and
  - first control means (not shown in the attached FIGURE for simplicity of illustration) configured to enable a user to control, i.e. govern, the external vision system for aiming and firing 10 and the associated weapon, or, in the case of user-requested change of operational role, the external vision system for command and control 11;
- a command and control user interface 14 that is installed inside the crew compartment of the military land vehicle in a command station, is connected to the video unit to receive a video stream between the third and fourth video streams or, in the case of user-requested change of operational role, between the first and the second video streams, and includes
  - a second screen (not shown in the attached FIGURE for simplicity of illustration) configured to display the video stream received from said video unit 12, and
  - second control means (not shown in the attached FIGURE for simplicity of illustration) configured to enable a user to control, i.e. govern, the external vision system for command and control 11, or, in the case of a user-requested role change, the external vision system for aiming and firing 10 and the associated weapon;

an interface 15 for on-board systems/devices/equipment of the military land vehicle;

on-board systems/devices/equipment 16 of the military land vehicle that are connected to the interface 15 and comprise aiming systems/devices/equipment of the weapon and of the associated external vision system 10 (i.e. of the first and second video capture devices), firing systems/devices/equipment of the weapon, aiming systems/devices/equipment of the external vision system for command and control 11 (i.e. of the third and fourth video capture devices) and close-defence perimeter sensors; and a SERCOS III communications bus 17, to which the external vision system for aiming and firing 10, the external vision system for command and control 11, the video unit 12, the aiming and firing user interface 13, the command and control user interface 14 and the interface 15 of the on-board systems/devices/equipment 16 are connected.

In detail, the interconnection between the various systems/devices/equipment (i.e., the external vision system for aiming and firing 10, the external vision system for command and control 11, the video unit 12, the aiming and firing user interface 13, the command and control user interface 14 and the interface 15 of the on-board systems/devices/equipment 16) is implemented via the SERCOS III communications bus 17 with closed-loop redundancy. This communications bus is a deterministic bus capable of high-speed data transmission and enables the realization of a servo loop between high-bandwidth devices. The interface 15 represents the master node of the loop and regulates communications within said loop, or rather on the SERCOS III communications bus 17, while every other system/device connected to said SERCOS III communications bus 17 represents a slave node of the loop. In other words, the interface 15 regulates the transit of information carried by the SERCOS III communications bus 17 to each slave node of the loop.

Entering into greater detail, the command and control user interface 14 installed in the command station is originally destined to control the external vision system for command and control 11 to perform observation and designation duties, while the aiming and firing user interface 13 installed in the artilleryman's/gunner's station is originally destined to control the external vision system for aiming and firing 10 and the associate weapon to perform aiming and firing duties.

In the case where the commander of the military land vehicle (or another operator who occupies the command station) requests a change of operational role for the command and control user interface 14, i.e. requests to control the external vision system for aiming and firing 10 and the associated weapon instead of the external vision system for command and control 11, the command and control user interface and the aiming and firing user interface 13 are reconfigured so as to exchange their operational roles, i.e. in such a way that the command and control user interface 14 starts to control the external vision system for aiming and firing 10 and the associated weapon, and the aiming and firing user interface 13 starts to control the external vision system for command and control 11.

Instead, in the case where artilleryman/gunner of the military land vehicle (or another operator who occupies the artilleryman/gunner station) requests a change of operational role for the aiming and firing user interface 13, i.e. requests to control the external vision system for command and control 11 instead of the external vision system for aiming and firing 10 and the associated weapon, the commander (or another operator who occupies the command station) must necessarily give or refuse his/her assent via the command and control user interface 14. Conveniently, if assent is not provided or refused within a predetermined time period (for example, because the command and control user interface 14 is damaged, or because the commander or another operator who occupies the command station is unable to provide/refuse this assent), assent is given automatically. Once assent is given, the aiming and firing user interface 13 and the command and control user interface 14 are reconfigured so as to exchange their operational roles, i.e. in such a way that the aiming and firing user interface 13 starts to control the external vision system for command and control 11 and the command and control user interface 14 starts to control the external vision system for aiming and firing 10 and the associated weapon.

Furthermore, in the event of one of the two user interfaces failing, it is possible to alternately control both of the external vision systems 10 and 11 via the other user interface, using the operational role change function as necessary.

In detail, in the event of exchanging operational roles between the aiming and firing user interface 13 and the command and control user interface 14, or rather in the event of changing the operational role for the command and control user interface 14, said command and control user interface 14 will start to:

send, over the SERCOS III communications bus 17,
commands to the video unit 12 so as to cause said video unit 12 to provide said command and control user interface 14 with the first or second video stream instead of the third or fourth video stream, operating commands to the external vision system for aiming and firing 10 instead of to the external vision system for command and control 11, and, operating commands, via interface 15, to the aiming systems/devices/equipment of the weapon and of the associated external vision system 10 and to the firing systems/devices/equipment of the weapon, instead of to the aiming systems/devices/equipment of the external vision system for command and control 11; and exchange data over the SERCOS III communications bus 17 with the external vision system for aiming and firing 10 (instead of with the external vision system for command and control 11) and, via interface 15, with the aiming systems/devices/equipment of the weapon and of the associated external vision system 10 and with the firing systems/devices/equipment of the weapon (instead of with the aiming systems/devices/equipment of the external vision system for command and control 11).

Similarly, in the event of exchanging operational roles between the aiming and firing user interface 13 and the command and control user interface 14, or rather in the event of changing the operational role for the aiming and firing user interface 13, said aiming and firing user interface 13 will start to:

send, over the SERCOS III communications bus 17,
commands to the video unit 12 so as to cause said video unit 12 to provide said aiming and firing user interface 13 with the third or fourth video stream instead of the first or second video stream, operating commands to the external vision system for command and control 11 instead of to the external vision system for aiming and firing 10, and, operating commands, via interface 15, to the aiming systems/devices/equipment of the external vision system for command and control 11, instead of to the aiming systems/devices/equipment of the weapon and of the associated external vision system 10 and to the firing systems/devices/equipment of the weapon; and exchange data over the SERCOS III communications bus 17 with the external vision system for command and control 11 (instead of with the external vision system for aiming and firing 10) and, via interface 15, with the aiming systems/devices/equipment of the external vision system for command and control 11 (instead of with the aiming systems/devices/equipment of the weapon and of the associated external vision system 10, and the firing systems/devices/equipment of the weapon).

One and the same universal software application and/or embedded firmware capable of dialoguing with both the external vision system for aiming and firing 10 and the external vision system for command and control 11, is installed on the aiming and firing user interface 13 and on the command and control user interface 14. From the characteristics of the messages exchanged over the SERCOS III communications bus 17, the software and/or firmware application enables the user interface to recognise the external vision system to be controlled and consequently the operational role to be performed.

Conveniently, the control means of each user interface comprise:
- a respective control stick or a respective joystick that can be operated to control, according to the operational role performed/taken on by the user interface, the aiming of the external vision system for aiming and firing 10 and the associated weapon, or of the external vision system for command and control 11, by sending opportune operating commands over the SERCOS III communications bus 17 and interface 15 to the aiming systems/devices/equipment of the weapon and the associated external vision system 10 and to the firing systems/devices/equipment of the weapon, or to the aiming systems/devices/equipment of the external vision system for command and control 11, i.e. operating commands that cause opportune operation of the aiming systems/devices/equipment of the weapon and the associated external vision system 10 and of the firing systems/devices/equipment of the weapon, or of the aiming systems/devices/equipment of the external vision system for command and control 11;
- respective control buttons (for example, provided on the edges of the first/second screen or on a control panel separate from the first/second screen) that can be operated to
  - request the change of operational role for the user interface,
  - only in the case of the command and control user interface 14, provide or refuse assent to the change of operational role requested by a user of the aiming and firing user interface 13,
  - select the type of video stream (in the visible or IR spectral band) displayed on the first/second screen, i.e. select, according to the operational role performed/taken on by the user interface, the display of the first or second video stream, or of the third or fourth video stream, on the first/second screen,
  - set predetermined operating parameters for the user interface, etc.; and
- a respective firing button (for example, provided on the control stick or on the joystick) operable to cause the weapon to fire (by sending one or more fire commands over the SERCOS III communications bus 17 and interface 15 to the firing systems/devices/equipment of the weapon, i.e. one or more fire commands so as to cause the firing systems/devices/equipment of the weapon to activate the firing of the weapon).

Lastly, the video unit 12 is configured to:
- receive the video streams generated by all of the video capture devices installed on the military land vehicle, in particular by the first, second, third and fourth video capture devices, as well as by the close-defence perimeter sensors; and
- supply the aiming and firing user interface 13 and the command and control user interface 14 with one or more of the video streams received as input.

In particular, in use, a user can choose the video stream to display on the screen of said user interface via the control buttons of the user interface being used, whether said video stream originates from the first, second, third or fourth video capture device, or said video stream originates from a close-defence perimeter sensor.

The advantages of the present invention can be immediately understood from the foregoing description.

In particular, the present invention enables military personnel on board a military land vehicle to control all the external vision systems installed on the vehicle from any station.

In particular, the present invention enables recovering control of an external vision system in the event of failure of the corresponding associated user interface (or part thereof) via the user interface of the other external vision system.

In addition, the present invention allows just one operator to alternatively control both external vision systems from a single station in the event of the second operator being absent.

On the other hand, the present invention allows using a same universal software application and/or firmware for both user interfaces, which allows reducing software and/or firmware code development and testing costs and permits more thorough and efficient software and/or firmware code tests, or rather such as to minimize errors and malfunctions of said universal software application and/or firmware.

Furthermore, the use of a single universal software application and/or firmware for both user interfaces results in each user interface automatically recognising the external vision system to control (plug-and-play feature).

Finally, it is clear that various modifications can be applied to the present invention without departing from the scope of the invention defined in the appended claims.

The invention claimed is:

1. A system of command and control and of aiming and firing designed to be installed on board a military land vehicle equipped with at least one weapon;
said system comprising:
- an external vision system for aiming and firing operationally associated with a weapon of the military land vehicle and configured to capture a plurality of first video streams of a scene outside the military land vehicle in a direction in which said weapon is aimed;
- an external vision system for command and control configured to capture a plurality of second video streams of the scene outside the military land vehicle;

an aiming and firing user interface designed to be installed on board the military land vehicle in an artilleryman's/gunner's station and configured to perform:
  an operational role of aiming and firing by displaying one of the first video streams captured by the external vision system for aiming and firing and controlling the external vision system for aiming and firing and the associated weapon, and
  also an operational role of command and control by displaying one of the second video streams captured by the external vision system for command and control and controlling the external vision system for command and control; and
a command and control user interface designed to be installed on board the military land vehicle in a command station and configured to perform:
  the operational role of command and control by displaying one of the second video streams captured by the external vision system for command and control and controlling the external vision system for command and control, and
  also the operational role of aiming and firing by displaying one of the first video streams captured by the external vision system for aiming and firing and controlling the external vision system for aiming and firing and the associated weapon;
wherein the command and control user interface is further configured to:
  enable a respective user of the command and control user interface to request a change of operational role for said command and control user interface;
  start performing the operational role of aiming and firing if the respective user requests the change of operational role for said command and control user interface when the command and control user interface is performing the operational role of command and control;
  start performing the operational role of command and control if the respective user requests the change of operational role for said command and control user interface when the command and control user interface is performing the operational role of aiming and firing; and
  enable the respective user to give or refuse his/her assent to a change of operational role requested by a second respective user of the aiming and firing user interface for said aiming and firing user interface; and
the aiming and firing user interface is further configured to:
  enable the second respective user of the aiming and firing user interface to request a change of operational role for said aiming and firing user interface;
  start performing the operational role of command and control if the second respective user requests the change of operational role for said aiming and firing user interface when the aiming and firing user interface is performing the operational role of aiming and firing and if the respective user of the command and control user interface gives his/her assent to said change of operational role;
  start performing the operational role of command and control if the second respective user requests the change of operational role for said aiming and firing user interface when the aiming and firing user interface is performing the operational role of aiming and firing and if, within a predetermined time period, the respective user of the command and control user interface neither gives nor refuses his/her assent to said change of operational role;
  start performing the operational role of aiming and firing if the second respective user requests the change of operational role for said aiming and firing user interface when the aiming and firing user interface is performing the operational role of command and control and if the respective user of the command and control user interface gives his/her assent to said change of operational role;
  start performing the operational role of aiming and firing if the second respective user requests the change of operational role for said aiming and firing user interface when the aiming and firing user interface is performing the operational role of command and control and if, within a predetermined time period, the respective user of the command and control user interface neither gives nor refuses his/her assent to said change of operational role; and
  continue to perform the operational role that is already being performed if the second respective user requests the change of operational role for said aiming and firing user interface and the respective user of the command and control user interface refuses his/her assent to said change of operational role.

2. The system of claim 1, wherein the aiming and firing user interface is configured to:
  start performing the operational role of command and control if the respective user of the command and control user interface requests a change of operational role for said command and control user interface when the command and control user interface is performing the operational role of command and control; and,
  start performing the operational role of aiming and firing if the respective user of the command and control user interface requests a change of operational role for said command and control user interface when the command and control user interface is performing the operational role of aiming and firing;
and wherein the command and control user interface is configured to:
  start performing the operational role of aiming and firing if the second respective user of the aiming and firing user interface requests a change of operational role for said aiming and firing user interface when the aiming and firing user interface is performing the operational role of aiming and firing and if the respective user of the command and control user interface gives his/her assent to said change of operational role;
  start performing the operational role of aiming and firing if the respective second user of the aiming and firing user interface requests a change of operational role for said aiming and firing user interface when the aiming and firing user interface is performing the operational role of aiming and firing and if, within a predetermined time period, the respective user of the command and control user interface neither gives nor refuses his/her assent to said change of operational role;
  start performing the operational role of command and control if the respective second user of the aiming and firing user interface requests a change of operational role for said aiming and firing user interface when the aiming and firing user interface is performing the operational role of command and control and if the respective user of the command and control user interface gives his/her assent to said change of operational role;

start performing the operational role of command and control if the respective second user of the aiming and firing user interface requests a change of operational role for said aiming and firing user interface when the aiming and firing user interface is performing the operational role of command and control and if, within a predetermined time period, the respective user of the command and control user interface neither gives nor refuses his/her assent to said change of operational role; and continue to perform the operational role that is already being performed if the respective second user of the aiming and firing user interface requests a change of operational role for said aiming and firing user interface and the respective user of the command and control user interface refuses his/her assent to said change of operational role.

3. The system according to claim 1, further comprising a video unit that is connected to the external vision system for aiming and firing and to the external vision system for command and control to receive the first and second captured video streams, respectively;

wherein the aiming and firing user interface is connected to the video unit to receive one of the first video streams or one of the second video streams and is configured to:

control the video unit to receive one of the first video streams from the video unit if it is performing the operational role of aiming and firing; and control the video unit to receive one of the second video streams from the video unit if it is performing the operational role of command and control; and wherein the command and control user interface is connected to the video unit to receive one of the first video streams or one of the second video streams and is configured to:

control the video unit to receive one of the second video streams from the video unit if it is performing the operational role of command and control; and control the video unit to receive one of the first video streams from the video unit if it is performing the operational role of aiming and firing.

4. The system according to claim 1, further comprising:
aiming systems or devices of the weapon and of the external vision system for aiming and firing;
firing systems or devices of the weapon; and
aiming systems or devices of the external vision system for command and control;
wherein the aiming and firing user interface is configured to:
perform the operational role of aiming and firing by controlling the aiming systems or devices of the weapon and of the external vision system for aiming and firing and the firing systems or devices of the weapon; and
perform the operational role of command and control by controlling the aiming systems or devices of the external vision system for command and control;
and wherein the command and control user interface is configured to:
perform the operational role of command and control by controlling the aiming systems or devices of the external vision system for command and control; and
perform the operational role of aiming and firing by controlling the aiming systems or devices of the weapon and of the external vision system for aiming and firing and the firing systems or devices of the weapon.

5. The system according to claim 1, further comprising:
an interface for on-board systems or devices of the military land vehicle; and
a deterministic communications bus that is connected to the external vision system for aiming and firing, the aiming and firing user interface, the external vision system for command and control, the command and control user interface and the interface for the on-board systems or devices to form a communication loop;
wherein the interface for the on-board systems or devices is configured to act as a master node of the communication loop controlling all communications on said deterministic communications bus;
and wherein the external vision system for aiming and firing, the aiming and firing user interface, the external vision system for command and control and the command and control user interface are configured to act as slave nodes of the communication loop.

6. The system of claim 5, wherein the deterministic communications bus is based on serial real-time communication system III technology.

7. The system according to claim 1, further comprising:
a video unit that is connected to
the external vision system for aiming and firing and the external vision system for command and control to receive the first and second captured video streams, respectively,
the aiming and firing user interface to supply the aiming and firing user interface with one of the first or the second video streams, and
the command and control user interface to supply the command and control user interface with one of the first or the second video streams;
an interface for on-board systems or devices of the military land vehicle that include
aiming systems or devices of the weapon and of the external vision system for aiming and firing,
firing systems or devices of the weapon, and
aiming systems or devices of the external vision system for command and control; and
a deterministic communications bus that is based on serial real-time communication system III technology and is connected to the external vision system for aiming and firing, the aiming and firing user interface, the external vision system for command and control, the command and control user interface, the video unit and the interface for the on-board systems or devices;
wherein the aiming and firing user interface is configured to:
when performing the operational role of aiming and firing,
send commands over the deterministic communications bus to the video unit to cause the video unit to supply one of the first video streams to said aiming and firing user interface,
control the external vision system for aiming and firing by sending operational commands over the deterministic communications bus to said external vision system for aiming and firing, and
control the aiming systems or devices of the weapon and of the external vision system for aiming and firing and the firing systems or devices of the weapon by sending operational commands over the deterministic communications bus and through the interface for the on-board systems or devices to said aiming systems or devices of the weapon and of the external vision system for aiming and firing and to said firing systems or devices of the weapon; and, when performing the operational role of command and control, send commands over the deterministic communications bus to the video unit to cause the video unit to supply one of the second video streams to said aiming and firing user interface, control the external vision system for command and control by sending operational commands over the deterministic communications bus to said external vision system for command and control, and control the aiming systems or devices of the external vision system for command and control by sending operational commands over the deterministic communications bus and through the interface for the on-board systems or devices to said aiming systems or devices of the external vision system for command and control;

and wherein the command and control user interface is configured to:

when performing the operational role of command and control, send commands over the deterministic communications bus to the video unit to cause the video unit to supply one of the second video streams to said command and control user interface, control the external vision system for command and control by sending operational commands over the deterministic communications bus to said external vision system for command and control, and control the aiming systems or devices of the external vision system for command and control by sending operational commands over the deterministic communications bus and through the interface for the on-board systems or devices to said aiming systems or devices of the external vision system for command and control; and, when performing the operational role of aiming and firing, send commands over the deterministic communications bus to the video unit to cause the video unit to supply one of the first video streams to said command and control user interface, control the external vision system for aiming and firing by sending operational commands over the deterministic communications bus to said external vision system for aiming and firing, and control the aiming systems or devices of the weapon and of the external vision system for aiming and firing and the firing systems or devices of the weapon by sending operational commands over the deterministic communications bus and through the interface for the on-board systems or devices to said aiming systems or devices of the weapon and of the external vision system for aiming and firing and to said firing systems or devices of the weapon.

8. A military land vehicle equipped with at least one weapon and comprising a system of command and control and of aiming and firing including:

an external vision system for aiming and firing operationally associated with a weapon of the military land vehicle and configured to capture a plurality of first video streams of a scene outside the military land vehicle in a direction in which said weapon is aimed;

an external vision system for command and control configured to capture a plurality of second video streams of the scene outside the military land vehicle;

an aiming and firing user interface designed to be installed on board the military land vehicle in an artilleryman's/gunner's station and configured to perform:

an operational role of aiming and firing by displaying one of the first video streams captured by the external vision system for aiming and firing and controlling the external vision system for aiming and firing and the associated weapon, and also an operational role of command and control by displaying one of the second video streams captured by the external vision system for command and control and controlling the external vision system for command and control; and a command and control user interface designed to be installed on board the military land vehicle in a command station and configured to perform:

the operational role of command and control by displaying one of the second video streams captured by the external vision system for command and control and controlling the external vision system for command and control, and also the operational role of aiming and firing by displaying one of the first video streams captured by the external vision system for aiming and firing and controlling the external vision system for aiming and firing and the associated weapon;

wherein the command and control user interface is further configured to:

enable a respective user of the command and control user interface to request a change of operational role for said command and control user interface;

start performing the operational role of aiming and firing if the respective user requests the change of operational role for said command and control user interface when the command and control user interface is performing the operational role of command and control;

start performing the operational role of command and control if the respective user requests the change of operational role for said command and control user interface when the command and control user interface is performing the operational role of aiming and firing; and enable the respective user to give or refuse his/her assent to a change of operational role requested by a second respective user of the aiming and firing user interface for said aiming and firing user interface; and the aiming and firing user interface is further configured to:

enable the second respective user of the aiming and firing user interface to request a change of operational role for said aiming and firing user interface;

start performing the operational role of command and control if the second respective user requests the change of operational role for said aiming and firing user interface when the aiming and firing user interface is performing the operational role of aiming and firing and if the respective user of the command and control user interface gives his/her assent to said change of operational role;

start performing the operational role of command and control if the second respective user requests the change of operational role for said aiming and firing user interface when the aiming and firing user interface is performing the operational role of aiming and firing and if, within a predetermined time period, the respective user of the command and control user interface neither gives nor refuses his/her assent to said change of operational role;

start performing the operational role of aiming and firing if the second respective user requests the change of operational role for said aiming and firing user interface when the aiming and firing user interface is performing the operational role of command and control and if the respective user of the command and control user interface gives his/her assent to said change of operational role;

start performing the operational role of aiming and firing if the second respective user requests the change of operational role for said aiming and firing user interface when the aiming and firing user interface is performing the operational role of command and control and if, within a predetermined time period, the respective user of the command and control user interface neither gives nor refuses his/her assent to said change of operational role; and continue to perform the operational role that is already being performed if the second respective user requests the change of operational role for said aiming and firing user interface and the respective user of the command and control user interface refuses his/her assent to said change of operational role.

* * * * *